Aug. 4, 1959  F. F. OFFNER  2,897,720

LIGHT METER

Filed Dec. 2, 1954

INVENTOR

Franklin F Offner

BY Pierce, Scheffler & Parker
ATTORNEYS

United States Patent Office 2,897,720
Patented Aug. 4, 1959

2,897,720

LIGHT METER

Franklin F. Offner, Chicago, Ill.

Application December 2, 1954, Serial No. 472,651

6 Claims. (Cl. 88—23)

The present invention relates to light measuring meters of the photoelectric type such as are used for example in photographic work, and commonly called "exposure meters," for measuring the amount of light present in order that the proper exposure time may set on the camera lens, and is directed particularly to an improved arrangement for increasing the sensitivity of the meter and improving its performance at low light values where the response of the photocell is very poor.

In the past, photoelectric light meters have been made utilizing barrier layer photoelectric cells connected to sensitive microammeters. These have suffered from two limitations; first, in order to obtain light readings at dim light values, it was necessary to make the ammeter itself very sensitive, requiring a low torque type instrument movement. This made the meter very delicate, and difficult to balance properly; and secondly, even with the most sensitive meter practical, it was impossible to obtain satisfactory readings under very low light level conditions.

The present invention eliminates both of the aforesaid disadvantages. By providing greatly amplified power, a more rugged electrical meter may be used, and yet a very much more sensitive light meter may be produced. More specifically, the greatly increased power from the photocell is produced by interposing a transistor type amplifier between the photocell and the meter. Various embodiments of the invention are possible within the scope of the inventive concept to be defined in the claims appended hereto, and the accompanying drawings illustrate a few of such possibilities.

Figure 3:
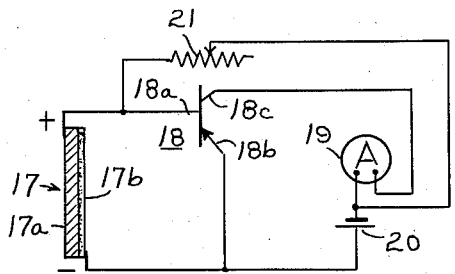
Fig. 3 illustrates a further modification similar to the circuit shown in Fig. 2.
Figure 4:
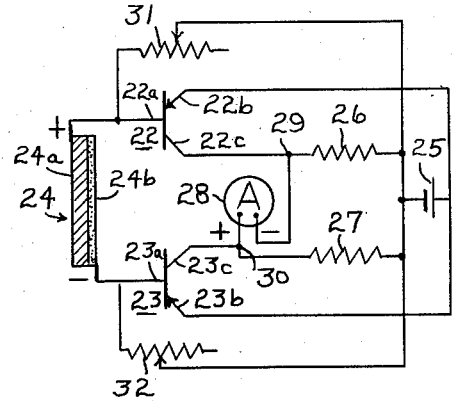
Figure 5:
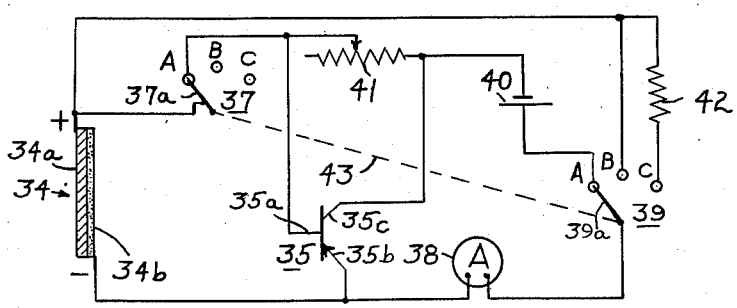

Fig. 4 illustrates still another modification utilizing two transistors in a balanced bridge circuit; and Fig. 5 shows still another embodiment of the invention similar to that of Fig. 3 and which further includes an arrangement for cutting the transistor amplifier out of the circuit and applying the output of the photocell directly to the electric meter, this arrangement being useful for the higher order of light values to be measured.

Figure 1:
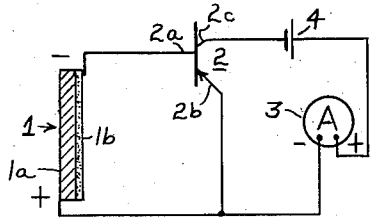
Fig. 1 is a circuit diagram illustrating a very simple arrangement for incorporating the transistor between the photocell and electrical meter.

With reference now to the drawings, and Fig. 1 in particular, it will be seen that the invention provides an improved light meter organization comprising a barrier layer type photoelectric cell 1, a P-N-P junction type transistor 2, an electric meter 3 which can be an ammeter having its scale graduated to read in terms of light intensity and a source of power, such as dry cell battery 4. The output leads from the base 1a and collector electrode contacting the photosensitive layer 1b of cell 1 are connected to the emitter 2b and base 2a respectively of transistor 2. Battery 4, which need have only a 1 volt or 1.5 volt output, and electric meter 3 are arranged in series and connected to the output of the transistor, i.e. to collector electrode 2c and emitter electrode 2b. The negative side of battery 4, as related to electron flow, is connected to collector electrode 2c, and the positive side of battery 4 is connected through meter 3 to the emitter electrode 2b. With this arrangement, the output of cell 1 is amplified by transistor 2, and the output of the latter is applied to the electric meter 3 thus measuring the amount of light received by the photoelectric cell 1.

In addition to amplifying the current from photocell 1 up to 100 times, transistor 2 has an inherently very high output resistance so that a high resistance type electric meter 3 may be used. Consequently more turns of wire can be used on the deflecting coil of the meter which carries the pointer thus resulting in a still higher gain in effective sensitivity. Moreover, since higher currents are available for actuating the meter 3, the latter can be built far more ruggedly than has heretofore been possible for, as indicated in the introduction, the very low order of current output from the photoelectric cell without amplification in accordance with the present inventive concept required the use of very delicate meter movements operating at very low torques.

While the amplifier arrangement shown in Fig. 1 is capable of giving a most useful amplification and sensitivity, it does not make use fully of the possibilities of the transistor, with the usual values of characteristics of cell 1 and transistor 2. This is because of the variation in base input resistance of transistors, with collector current. Over the range of very low collector currents at which the circuit operates at low light values, the base resistance of the transistor is approximately inversely proportional to the collector current. At two microamperes collector current, a representative value of base resistance would be 500,000 ohms. But since the cell internal resistance may be about 5,000 ohms, it is apparent that the high base resistance severely limits the base input current to the transistor, and only about the one percent of its maximum value is utilized.

If, however, the current through the transistor at low light levels is increased to, for example, 200 microamperes, the base input resistance is reduced by a factor of 100, to 5,000 ohms. Thus the base current is now one-half of the maximum value obtainable from the 5,000 ohm cell, into zero load resistance.

Figure 2:
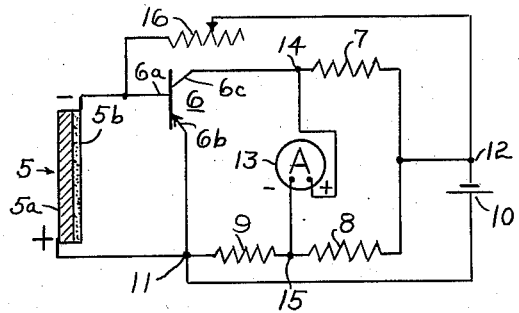
Fig. 2 illustrates a somewhat different embodiment wherein the transistor is connected in a balanced bridge circuit which results in greater sensitivity.

A circuit for accomplishing the latter is shown in Fig. 2. There it will be seen that the output leads of barrier layer type cell 5 are connected to the input base 6a and emitter electrode 6b of P-N-P junction type transistor 6 respectively in the same manner as for the Fig. 1 arrangement. Transistor 6 constitutes one arm of a bridge circuit, the other three arms being constituted by resistors 7, 8 and 9. Battery 10 is connected across one pair of diagonal terminal points 11, 12 of the bridge, and the electric meter 13 is connected across the other pair of bridge diagonal terminal points 14, 15. A variable resistor 16 is connected between terminal point 12 of the bridge and the input base 6a of transistor 6 by which current from battery 10 is introduced into the base circuit of transistor 6, increasing the current from collector electrode 6c as desired. Meter 13 being across the output terminals 14, 15 of the bridge will permit the meter to be zeroed with zero current from photocell 5, i.e. a condition of zero light. The zero light base current is adjusted by adjustment of the variable resistor 16 for the purpose of zeroing meter 13. The zero light collector current value may be chosen so that the base input resistance is equal to, or lower than, the resistance of photocell 5 at low light values.

The circuit arrangement according to the embodiment illustrated in Fig. 3 accomplishes the same objective as the circuit of Fig. 2 but by using the electric meter in reverse direction to indicate full scale deflection with zero light, rather than by the bridge balance of meter zero light current as in the Fig. 2 circuit. With reference now to Fig. 3 it will be seen that as with the prior described circuits, the output leads of barrier layer type photocell 17 are connected to the input base 18a and emitter electrode 18b of P-N-P junction type transistor 18, respectively. Electric meter 19 and battery 20 are arranged in series and connected to the collector electrode 18c and emitter electrode 18b. A variable resistor 21 is connected between the input base 18a and the negative terminal of battery 20 so as to introduce additional current into the base circuit of transistor 18, and resistor 21 is adjusted until electric meter 19 produces a full scale reading with a zero light input to photocell 17. This reading then corresponds to zero light and the scale would be so marked. Photocell 17 is polarized as indicated in Fig. 3 so as to decrease the base current with increasing current from photocell 17, i.e. with increasing light, and thus increasing light causes the scale reading of meter 19 to decrease.

If desired, the zero current position of the pointer element of the electric meter 19 may be suppressed in order to allow the transistor to operate with appreciable collector current at all light values, and thus to maintain a more nearly constant sensitivity.

The circuit arrangement according to Fig. 4 makes use of two transistors 22, 23 in a balanced bridge circuit to accomplish the same objectives as the previous circuits of Figs. 2 and 3. Here the output leads from barrier layer type photocell 24 are connected respectively to the input bases 22a and 23a of P-N-P junction type transistors 22 and 23, and the emitter electrodes 22b and 23b are connected to the positive terminal of battery 25. Resistors 26 and 27 provide a bridge for the electric meter 28, one end of each of these resistors 26, 27 being connected to the negative terminal of battery 25 and the electric meter 28 being connected between the opposite ends of these resistors at terminals 29, 30 which consitute the bridge output. A connection is made from terminal 29 to the collector electrode 22c of transistor 22, and a similar connection is made from the other output terminal 30 to collector electrode 23c of transistor 23. The addition of transistor 22 to provide the balancing current through the meter 28 has the advantage that it also compensates for the effect of temperature variation, which will cause the current through the transistor to vary, and thus, as in the previous circuits, the current through the meter. If the two transistors 22, 23 are matched, the current variations with temperature will be cancelled out in the Fig. 4 circuit. Variable resistor 31 connected between the negative terminal of battery 25 and the input base 22a of transistor 22 is utilized to set the base (and thus collector) dark current at the desired value in transistor 22. Variable resistor 32, connected between the negative terminal of battery 25 and the input base 23a of transistor 23, is utilized, as in the previously described embodiments, to produce a zero scale reading in meter 28 at zero light condition.

The circuit arrangement illustrated in Fig. 5 is designed to permit the user to employ the transistor type amplifier as in the previously described embodiments for amplifying the output of the photocell when measuring comparatively low and medium orders of light intensities, and to permit the output of the photocell to be applied directly, i.e. without amplification, to the electric meter when measuring the higher orders of light intensities.

With reference now to Fig. 5, it will be seen that it is essentially the same as that of Fig. 3 except that the positions of the battery and electric meter are reversed in their circuit with the emitter and collector electrodes of the transistor in order to simplify the switching arrangement. The photosensitive layer 34b of barrier layer type photocell 34 is connected to the emitter electrode 35b of P-N-P junction type transistor 35 and the base terminal 34a of photocell 34 is connected to the movable arm 37a of switch 37 which is adapted to make contact with any one of three contacts A, B or C on this switch. Contacts B and C are blank, i.e. there is no circuit leading from either one, but contact A is connected to the input base 35a of transistor 35. One terminal of meter 38 is connected to the emitter electrode 35b of transistor 35 and the other terminal of meter 38 connects with the movable arm 39a of switch 39 which is adapted to make contact with any one of three contacts A, B or C of this switch. A connection leads from contact A of switch 39 to the positive side of battery 40, and connections extend respectively from the negative side of battery 40 to the collector electrode 35c of transistor 35, and through variable resistor 41 to the input base 35a of transistor 35 to introduce additional current into the base circuit of this transistor. Other connections lead from base terminal 34a of photocell 34 directly to contact B on switch 39, and indirectly through resistor 42 to contact C on switch 39. The movable switch arms 37a and 39a are preferably coupled together for movement simultaneously as indicated by linkage therebetween and shown schematically by broken lines 43.

When the movable switch arms of switches 37 and 39 are engaged wtih their contacts A it will be seen that the circuit operates similarly to that of Fig. 3 with the transistor 35 amplifying the output of photocell 34 and applying it to meter 38. This will be the position used when measuring light values of low and medium intensities. For measuring higher light values, in which case the output of the photocell is high enough to give a good reading on meter 38 without amplification, the switch arms 37a and 39a can be moved to engage their contacts B. In this position, transistor 35 is cut out of the circuit and the output terminals of photocell 34 lead directly to the terminals on meter 38. For measuring still higher light values, the switch arms 37a, 39a can be moved to engage their contacts C. In this position, the output of photocell 34 is also connected substantially directly to the meter 38 thus cutting out the transistor amplifier, this circuit however including a resistor 42 in series with the meter 38 which serves to lower still further the meter's sensitivity. It will be understood, of course, that meter 38 will be provided with a separate scale for each of the three different modes of operation since the response of the meter pointer will be different for each mode of operation. With the Fig. 5 circuit arrangement, the scale of meter 38 reverses when shifting from switch contact position A to positions B or C. Therefore the scale of the meter should be arranged to be changed in the well known conventional manner when changing scales. If, however, the circuit of Figs. 1, 2 or 4 is used in a multiple scale circuit of this type, the scale will always read in the same direction.

I claim:

1. A photoelectric exposure meter comprising, in circuit combination, a barrier layer type photoelectric cell, an electric indicating meter, a junction type transistor interposed between said cell and said indicating meter for amplifying the current output of said cell prior to applying said output to said indicating meter, and means for increasing the collector current of said transistor to effect a reduction in the base input resistance of said transistor at low light values, said transistor collector current increasing means comprising resistive means connected to the base of said transistor and to a source of electromotive force external to said cell.

2. A photoelectric exposure meter comprising, in circuit combination, a barrier layer type photoelectric cell, an electric indicating meter, a junction type transistor interposed between said cell and said indicating meter for amplifying the current output from said cell prior to applying said output to said indicating meter, a battery connected between the emitter and collector of said transistor and circuit means including a resistance connected between said battery and the base of said transistor for introducing additional current into the base circuit of said transistor thereby to increase the collector current of said transistor.

3. A photoelectric exposure meter comprising, in circuit combination, a barrier layer type photoelectric cell, a junction type transistor, means connecting the base and collector electrode leads from said cell to the base and emitter respectively of said transistor, an electric indicating meter and battery arranged in series and connected between the collector and emitter of said transistor, and circuit means including a resistance connected between said battery and the base of said transistor for introducing additional current into the base circuit of said transistor, said resistance being adjustable to increase the collector current of said transistor to establish full scale reading on said indicating meter with zero light on said cell.

4. A photoelectric exposure meter comprising, in circuit combination, a barrier layer type photoelectric cell, a junction type transistor, means including resistance means forming with the collector and emitter of said transistor a bridge circuit, an electric indicating meter connected to the output terminals of said bridge, a battery connected to the input terminals of said bridge, means connecting the collector and base of said cell to the base and emitter respectively of said transistor, and circuit means including a resistance connected between said battery and the base of said transistor for introducing additional current into the base circuit of said transistor, said resistance being adjustable to increase the collector current of said transistor to effect a zero reading on said indicating meter for zero light incoming to said cell.

5. A photoelectric exposure meter comprising, in circuit combination, a barrier layer type photoelectric cell, an amplifying circuit connected to the output of said cell, said amplifying circuit including two junction type transistors arranged in a balanced bridge, an indicating meter connected to the output of said bridge for reading the difference between the currents through said transistors, and means for introducing additional current into the base of each transistor comprising resistive means connected to the base of each transistor and to a source of electro-motive force external to said cell.

6. A photoelectric exposure meter comprising, in circuit combination, a barrier layer type photoelectric cell, an electric indicating meter, a junction type transistor for amplifying the current output from said cell, means for introducing additional current into the base of said transistor to effect a reduction in the base input resistance of said transistor at low light values, said additional current introducing means comprising resistive means connected to said base and to a source of electro-motive force external to said cell, and switching means arranged to selectively connect the output from said cell to said indicating meter through said transistor or directly to said indicating meter.

References Cited in the file of this patent

UNITED STATES PATENTS

| | | |
|---|---|---|
| 1,653,694 | Branson | Dec. 27, 1927 |
| 1,762,748 | Smith | June 10, 1930 |
| 2,124,031 | Freese et al. | July 19, 1938 |
| 2,417,023 | Sweet | Mar. 4, 1947 |
| 2,428,806 | Liben et al. | Oct. 14, 1947 |
| 2,457,289 | Warnick | Dec. 28, 1948 |
| 2,472,381 | McMaster | June 7, 1949 |
| 2,541,322 | Barney | Feb. 13, 1951 |
| 2,647,436 | Shapiro | Aug. 4, 1953 |
| 2,647,958 | Barney | Aug. 4, 1953 |
| 2,651,963 | Bischoff | Sept. 15, 1953 |
| 2,660,624 | Bergson | Nov. 24, 1953 |
| 2,745,021 | Kurshan | May 8, 1956 |

OTHER REFERENCES

"Photo-electricity," by Zworykin et al., published by J. Wiley and Sons, Inc., New York 1949. Page 231 relied on, page 232 of interest.